July 19, 1966  
M. J. G. TIPPER  
3,261,268  
PLEATER FOR SHEET MATERIAL AND MEANS  
FOR TYING AND CUTTING CASINGS  
Filed March 27, 1964  
7 Sheets-Sheet 2

INVENTOR.  
MAYNARD J. G. TIPPER  
BY  
ATTORNEY

INVENTOR.
MAYNARD J. G. TIPPER
BY
ATTORNEY

M. J. G. TIPPER

3,261,268

PLEATER FOR SHEET MATERIAL AND MEANS
FOR TYING AND CUTTING CASINGS

Filed March 27, 1964

INVENTOR.
MAYNARD J. G. TIPPER
BY
Gordon Wood
ATTORNEY

FIG_16

FIG_17

FIG_18

United States Patent Office 3,261,268
Patented July 19, 1966

3,261,268
PLEATER FOR SHEET MATERIAL AND MEANS
FOR TYING AND CUTTING CASINGS
Maynard J. G. Tipper, Oakland, Calif., assignor, by mesne assignments, to Rheem Manufacturing Company, New York, N.Y., a corporation of California
Filed Mar. 27, 1964, Ser. No. 355,502
8 Claims. (Cl. 93—84)

The present application is a continuation-in-part application of Serial No. 300,366 filed August 6, 1963, now abandoned.

This invention deals with the continuous production of fastened cut lengths of casings. More specifically, it relates to a machine and method of forming continuously, from a tubular roll of casing material, fastened and cut lengths of casing, as desired.

Machines have been made in the past for taking lengths of casing, such as sausage casing, pleating the end thereof, and then fastening the end prior to filling the casing with sausage emulsion, after which the other end is fastened. There has been a demand for some way of producing desired fastened cut lengths of casing from a continuous roll of tubular casing without use of pre-cut lengths of such casing material. Such a method would eliminate inventory of various lengths of pre-cut casings and would also avoid delay due to unavailable lengths and waste due to use of excessively long lengths, or inventory of discontinued lengths. Casing is available in tubular shape, in the form of flattened rolls, the material being plastic film, generally sold as "Mylar," "Saran," polyethylene, and the like, many types of which are now on the market.

The present invention involves the continuous pleating of the entire length of the casing, as it is fed continuously from a roll, and fastening and cutting the measured lengths, in any desired number, at a rate of 30 "bags" per minute or even faster.

The invention will be more readily understood by reference to the accompanying drawings in which.

Figure 1:
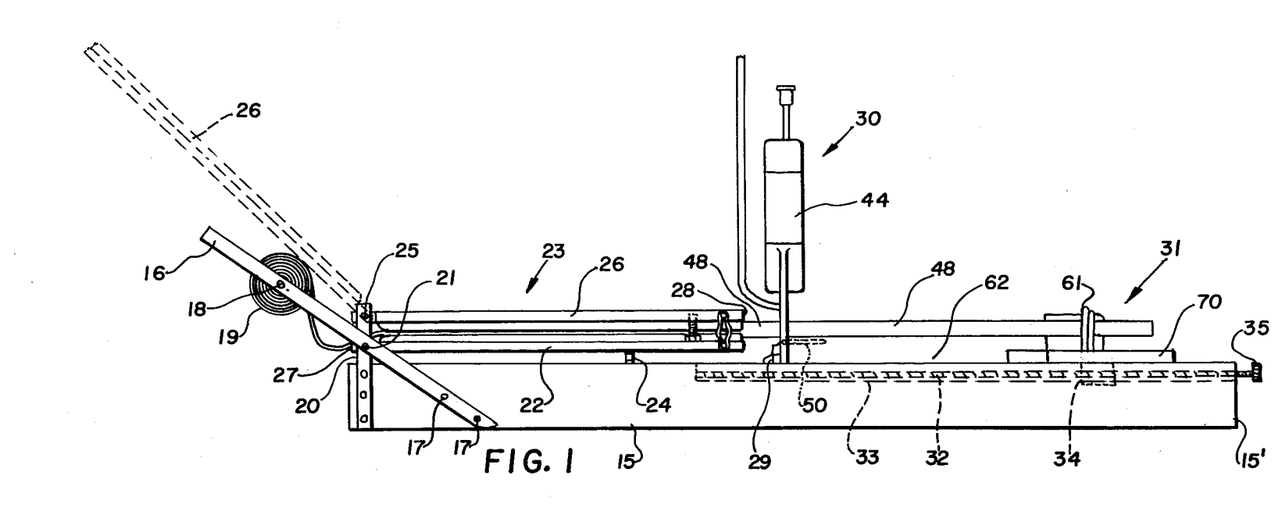
FIG. 1 depicts a front elevational view of a machine of the present invention in actual operation.

Referring again to the drawings, and more particularly to FIG. 1, numeral 15 designates a base on which is mounted a pair of angular supports 16 attached thereto at 17. Only one such support is shown in the side view in FIG. 1. Between supports 16 is mounted shaft 18 carrying a roll 19 of wound, flattened tubular plastic casing. Vertical supports 20 aid in supporting and steadying the angular supports 16. Attached to supports 16 at 21 is lower half 22 of the pleater, the latter indicated generally by numeral 23. The other end of pleater half 22 is fastened to vertical support 24. Also attached to supports 16 (or 20) at 25 in hinged relation is upper half 26 of pleater 23. It will be noted that the pleater (FIG. 4) has a wide feed end 27 and a narrow discharge end 28, from which latter is drawn the pleated casing 48.

Figure 11:
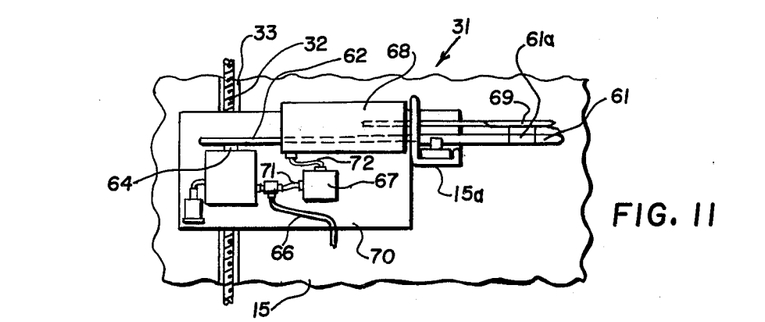
FIG. 11 shows a feed side elevational view (with base cut away) of the switching and cutting mechanism.

A short distance away from the pleater discharge end 28 is mounted (on base 15, at support 29) the fastener or clipper unit designated generally by numeral 30. Then, toward the other end 15' of base 15 is mounted the switching and cutting unit, designated generally by numeral 31. The latter is mounted on a sub-base 70 which has threaded mounting 34 (FIGS. 1 and 11) on its bottom, which sub-base rides in recess 33, in base 15, on lead screw 32, the latter being rotatable by handle 35. By this means it is possible to vary the distance of switch-cutter assembly 31 from fastener 30 to obtain the desired cut length of casing.

As shown in FIGS. 2-5, both the upper and lower halves 26 and 22, respectively, of the pleater are provided with projecting pleating elements or ridges 36 and 37, respectively (except at entrance area 27'), which ridges are wider apart at the feed ends 27 and very close together at the discharge ends 28 of their respective halves 26 and 22. The upper half 26 of pleater 23 is hinged on support 20 at 25 (FIG. 2) in a manner such that there is a gradual interleaving of the pleating ridges 36 and 37, starting at the feed end where they are vertically apart at 38 to the discharge end 28 where they are fully interleaved. The amount of interleaving at discharge end 28 may be adjusted by stop screw 58 to enable easier handling of wider or narrower tubes with any desired depth of folds. Halves 26 and 27 are locked together, for example by loop lock 57, or any other suitable lock, during operation of the unit.

Figure 6:
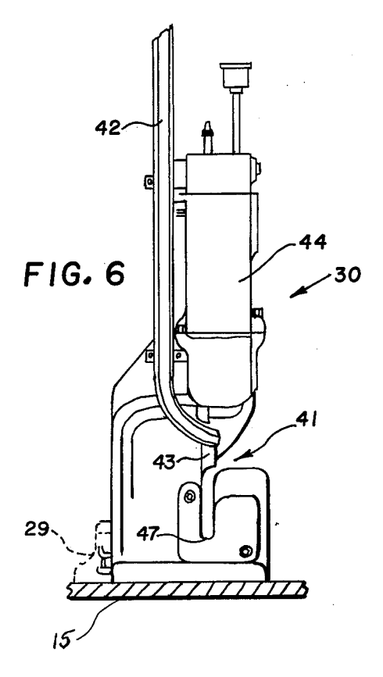
FIG. 6 is a side elevational view of the fastener.
Figure 10:
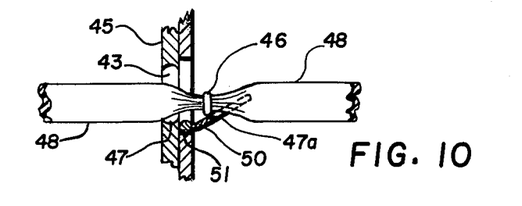
FIG. 10 is a more detailed cross-sectional front view of the fastener portion, as applying a fastener on a casing.

Fastener 30 is mounted directly on base 15 by support 29. The fastening portion unit is similar to that described in copending application Serial No. 262,761, filed on March 4, 1963, now abandoned, by Maynard J. G. Tipper, and includes a throat portion 41 through which the casing is pulled for the fastening operation. Magazine 42 (FIG. 6) feeds staples into channel 43, and a driver 45 (FIG. 10) in the lower end of air motor 44 drives the staple 46 down channel 43 and crosses the staple ends and crimps the staple against lower crimping die 47 around casing 48.

Figure 8:
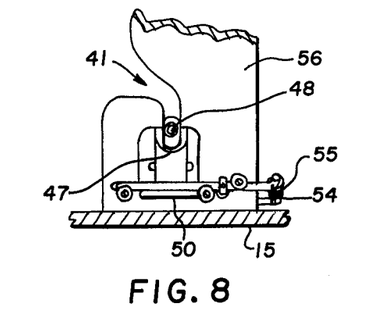
Figure 9:
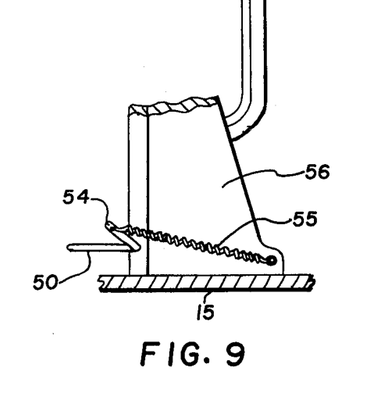

A new feature on the fastening unit 30 is gate 50 (FIGS. 7–8) which is hinged on shaft 51 held in place in groove 52 by washered screws 53. Shaft 51 has turned end 54 to which is fastened coil spring 55, the other end of the spring being attached to stand 56 (FIG. 9). The purpose of gate 50 is apparent from FIG. 10. When the fastener is crimped onto the casing 48, and the driver 45 is being withdrawn, it is possible to move the casing, fastener and all, toward the cutter assembly 31 by merely pulling it through spring-loaded gate 50.

Figure 7:
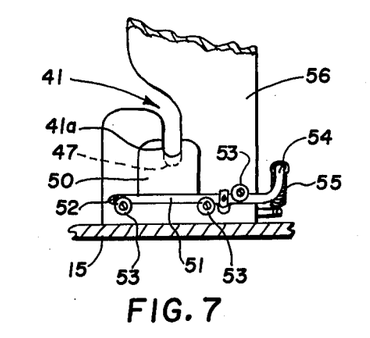
FIGS. 7, 8 and 9 depict the gate side of the lower portion of the fastener with gate closed (FIG. 7), and with gate open (FIG. 8), and the back of the lower portion thereof (FIG. 9), respectively

It will be noted that the pleated casing is disposed in throat portion 41a of gate 50 so that the gate is closed when the staple 46 is crimped around the casing. The fact that the gate is closed during this operation is important since the closed gate serves as a support for the casing, because the bottom of throat portion 41a is disposed above the level of lower crimping die 47 of the fastener 30 (FIG. 7). Thus the gate serves to prevent the staple points from picking up or piercing the casing during the crimping operation. After the crimping the fastener cannot pass through throat portion 41a, but when the casing is pulled toward switch and cutting unit 31, the staple pushes against gate 50 and thus causes opening of gate (FIG. 10) until the staple passes through, whereupon the gate closes again around the pleated casing.

Figure 12:
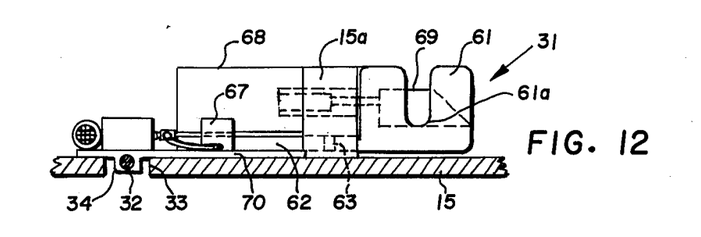
FIG. 12 is a top or plan view of FIG. 11.
Figure 13:
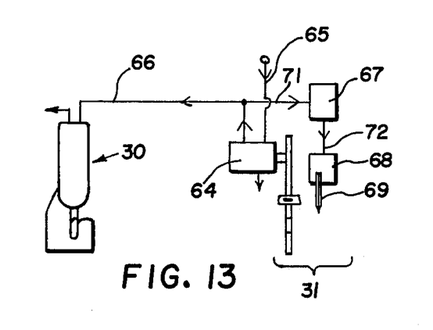
FIG. 13 illustrates a diagrammatic representation of the pneumatic connections involved in the machine.

Switching unit 31 (FIGS. 11–12) comprises thrust plate 61 having throat portion 61a, similar to 47a, in that the throat permits passage therethrough of pleated casing, but not the fastener crimped thereon. Plate 61 is attached to bar 62 which is hinged on housing portion 15a at 63, so that when a fastened casing is pulled through throat 61a, the thrust of the fastener crimped thereon causes hinged bar 62 to press upon pneumatic switch 64 which transfers pressure from main air lead 65 (FIG. 13) to fastener line 66, and to delay switch 67, which is a conventional switch arranged to delay the switching of air pressure to cutting cylinder 68 for about one-half second, thus giving the fastener 30 adequate time to crimp the casing before its end is cut off by knife 69. Cutter cylinder 68 is mounted on sub-base 70 in a manner such that its plunger, to which knife 69 is attached, will push out knife 69 along the outside of thrust plate 61, thereby cutting off the casing 48 protruding through throat 61a. By turning knob 35 (FIG. 1), sub-base 70 may be moved on screw 32 for the distance required to obtain the desired cut length of casing.

When in operation, the roll 19 of casing tubing is mounted on stand 26. Upper pleater half 26 is raised, and the casing is pulled out until it just extends out of narrow edge 28. Then, the pleater top is lowered and locked, and the pleated casing end at 28 is pulled through throat 41 of the fastening machine. Switch 64 is manually actuated to effect this, and the fastened end projecting from gate 50 is pulled (whereupon the staple opens the gate). After the staple has cleared gate 50, the gate closes and the casing end is pulled through throat 61a. When staple 46 pushes against plate 61, its movement on pivot 63 causes bar 62 to actuate pneumatic switch 64 which causes air pressure from main line 65 to enter lines 71 and 66. The pressure through line 66 causes fastener 30 to crimp on staple 46, while the pressure through line 71 actuates delay switch 67 for a ½-second delay, after which the pressure enters line 72 and cylinder 68, wherein the piston therein carries knife 69 which is pushed past throat 61a to cut off the casing. Thereafter, the cycle is repeated by pulling the cut casing end at throat 61a.

Although support 26 is shown here as being mounted on base 15, it is to be understood that a separate support for the casing roll may be employed near the feed end of the pleater.

Another form of pleater having certain advantages over the above described pleater is shown in FIGS. 14 through 21.

Figure 2:
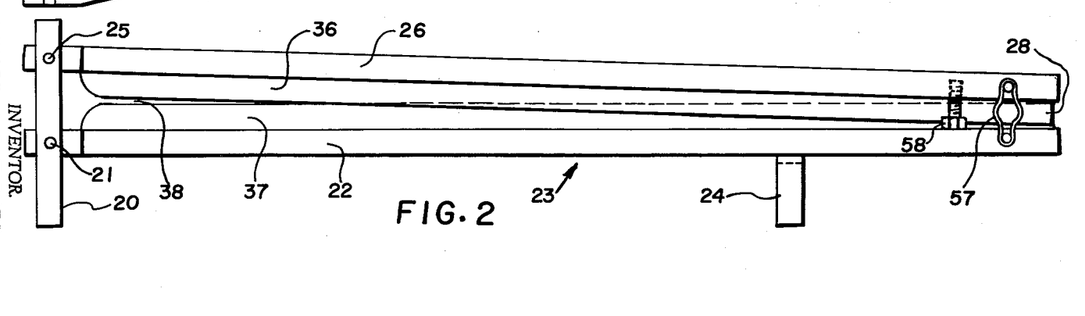
FIG. 2 illustrates a side view of the pleater in closed condition.
Figure 3:
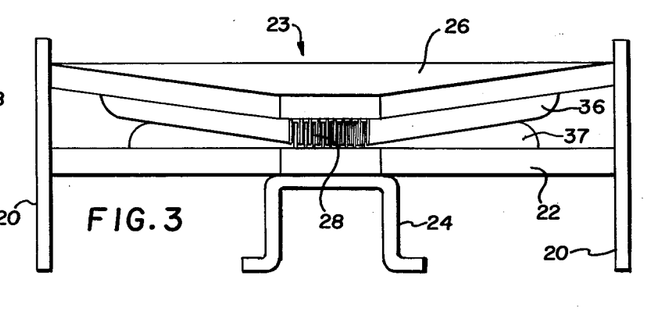
FIG. 3 shows an end view of FIG. 2.
Figure 4:
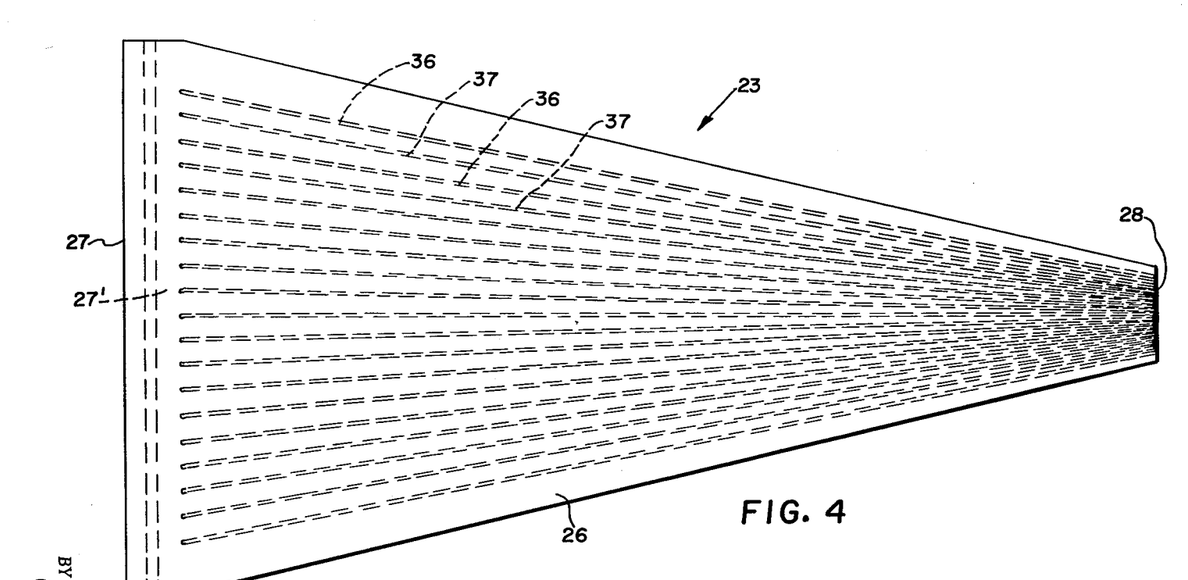
FIG. 4 presents a top or plan view of the pleater.
Figure 5:
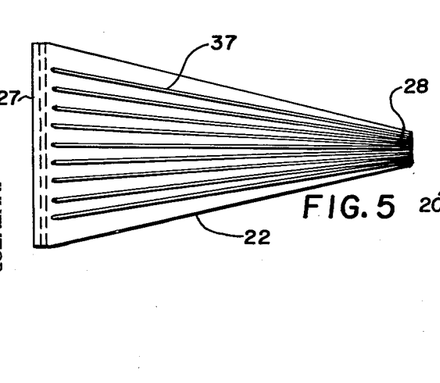
FIG. 5 depicts a top view of the bottom half of FIG. 4.

Before considering the second form of pleater in detail certain features of the pleater shown in FIGS. 2 and 4 should be considered. The arrangement of FIGS. 2 and 4 results in the sheet being very gradually folded from the rear or approach end to the forward or discharge end. Two essential operations take place in the transition between the approach and discharge ends of the pleater of FIGS. 2 and 4. One operation is the gradual folding of the sheet along the edges of the pleater elements. The other operation is the reduction in width of the pleats, that is, the compression together of the folds toward the restricted discharge end of the pleater. It is of interest to note in the operation of the pleater of FIGS. 2 and 4 that a point on the sheet in engagement with an edge of a pleater element at the approach end of the pleater stays in engagement with such edge along the length of the latter until the sheet is discharged from the discharge end. In other words, there is no transverse displacement of the material relative to the pleater elements but there is of course inward movement of the material toward the central plane of the pleater. Stated another way, there is no sliding movement of the material relative to the pleater elements in a transverse direction but merely sliding movement longitudinally of the pleater elements and the above mentioned compressive movement of the pleats toward the central plane of the pleater. The characteristics inherent in the pleater of FIGS. 2 and 4 are such that relatively deep pleats cannot readily be formed. This follows from the fact that the increase in depth of the pleats as the sheet progresses toward the discharge end of the pleater is limited by the amount the pleats can be compressed inwardly toward the central plane of the pleater since, as pointed out above, no transverse sliding movement is permitted between the material and the pleater elements. In summary, it may be said that the pleater of FIGS. 2 and 4 lends itself to use in pleating relatively narrow sheets with relatively shallow pleats.

The pleater disclosed in FIGS. 14 to 21 can be used to advantage when the width of the sheet to be pleated is relatively great and also when it is desired to form relatively deep pleats rather than shallow ones. In this connection it should be noted that several advantages accrue from minimizing the number of pleats formed and making the depth of each pleat as great as possible. First, the lesser number of pleater elements employed the less is the friction created and the less power required to pull the sheet through the pleater. Second, the amount of static electricity created by movement of the material through the pleater decreases with the decrease in the friction involved. Also, the lesser number of pleater elements employed the less space is required to perform the pleating operation.

Figure 14:
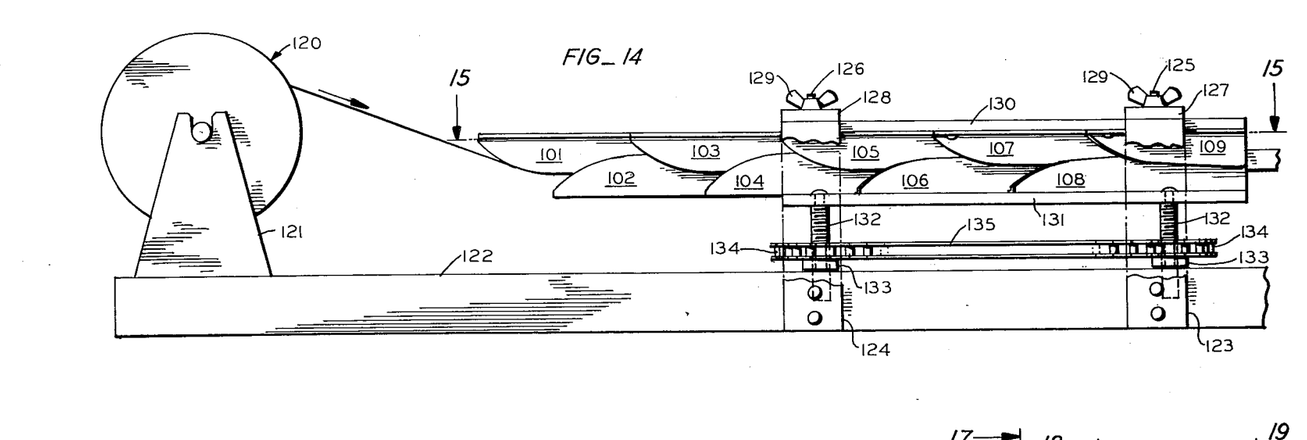
FIG. 14 is a side elevation of a modified form of pleater.

Referring now to FIG. 14, the sheet of material to be pleated is provided on a roll generally 120 and supported for rotation on suitable supports such as indicated at 121. A base 122 may be provided for supporting both the roll 120 and the pleater now to be described.

Extending upwardly from base 122 are forward transversely spaced posts 123 and rear transversely spaced posts 124. Supported on the upper ends of said posts are forward and rear transversely extending bars 127, 128, respectively, which may be removably secured to the posts 123, 124 by means of wing nuts 129 secured to studs 125, 126 extending upwardly from posts 123, 124, respectively.

To the lower sides of transversely extending bars 127, 128 is secured an upper mounting plate 130 which serves to support the downwardly extending pleater elements to be described.

In spaced opposed relationship to upper mounting plate 130 is a similar lower mounting plate 131 which serves to support the lower pleating elements to be described. Lower mounting plate 131 is supported on four vertically extending adjusting screws 132 which extend through base 122 at their lower ends and which are secured against rotation at their upper ends to the lower mounting plate 131. Said adjustment screws 132 are threadedly received in internally threaded bearings 133 which, in turn, are each provided with a sprocket 134. A continuous chain 135 is reeved about the four sprockets 134 so that upon movement of chain 135 in one direction the sprockets 134 all rotate in the same direction to move lower mounting plate 131 upwardly or downwardly depending on the direction of movement of chain 135. At this point it will be noted that this structure provides a simple and effective method of translating the lower pleater elements upwardly and downwardly to adjust the depth of the pleat desired. As will be seen later on such adjustment is also useful for starting the pleating operation by facilitating the movement of the sheet through the pleater.

Figure 15:
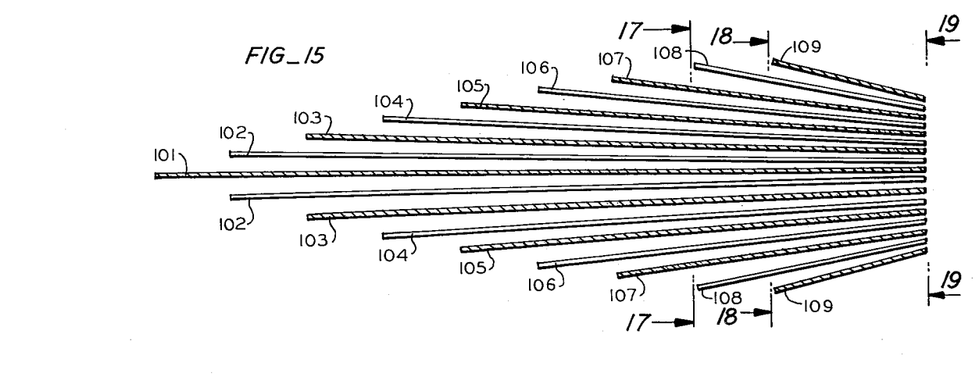
FIG. 15 is a horizontal section taken in a plane indicated by lines 15—15 of FIG. 14 with the horizontal flanges of the lower pleater elements omitted for clarity.
Figure 16:
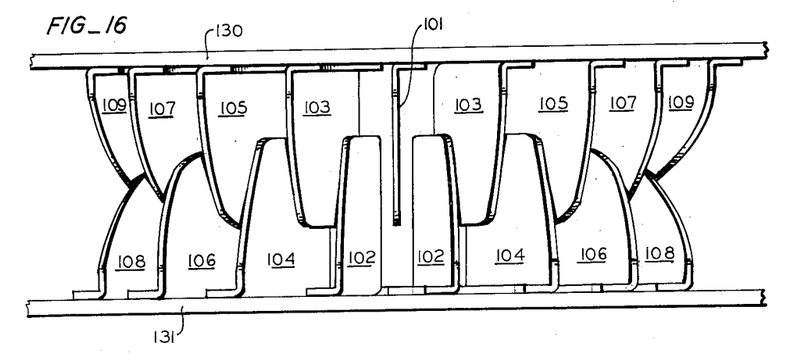
FIG. 16 is an end elevation of the pleater of FIG. 14 taken from the rear or approach end of the pleater.
Figure 20:
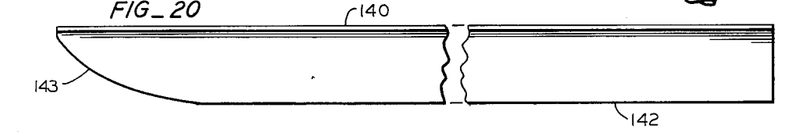
FIG. 20 is a side elevation of a typical inner pleater element.
Figures 21, 22:
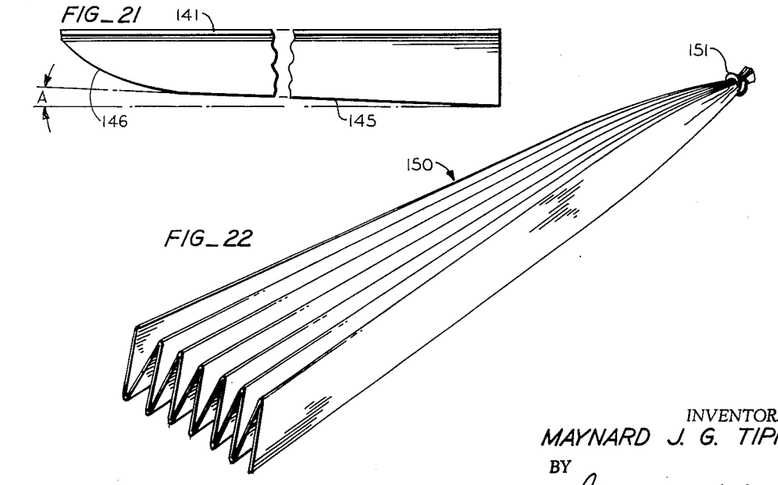
FIG. 21 is a side elevation of a typical outer pleater element.
FIG. 22 is a perspective of a pre-tied length of casing produced by the present invention.

In the drawings the upper pleater elements which extend downwardly from the upper mounting plate 130 are numbered 101, 103, 105, 107 and 109. The lower pleater elements that extend upwardly from the lower mounting plate 131 are numbered 102, 104, 106 and 108. It will be noted that there is one central upper pleater element 101 extending along the central plane of the pleater and an equal number of identical pleater elements on opposite sides of the central pleater element. Pleater elements 101, 102, 103 and 104 are illustrated in FIG. 20 and it will be noted that a horizontally extending flange 140 is formed integral with each of the above mentioned pleater elements to permit securement of the same to the associated mounting plate 130 or 131. Said flange 140 may be secured to the associated mounting plate by means of screws which are not shown in some of the views for the sake of clarity. The pleater elements 105, 106, 107, 108 and 109 are illustrated in FIG. 21 and each of said elements is provided with a horizontal flange 141 for securement to the associated mounting plate. In FIG. 15 the flanges 140 and 141 of the lower pleating elements are omitted for clarity.

From FIGS. 15 and 20 it will be noted that the central upper pleater element 101 and the adjacent six pleater elements 102, 103 and 104 are provided with sheet engaging edges 142 parallel to the flange 140. The rear or approach end of each of the pleater elements 101, 102, 103 and 104 is provided with a curved edge 143 as indicated. As seen in FIG. 21 the remaining pleater elements are provided with sheet engaging edges 145 which are inclined downwardly in the case of the upper pleater elements and upwardly in the case of the lower pleater elements so that sheet engaging elements of such pleater elements converge toward the sheet to be pleated. A similar curved end 146 is provided for said remaining pleater elements.

It will be noted at this point that the seven inner pleater elements 101, 102, 103 and 104 are provided with coplanar sheet engaging edges 142 whereas the corresponding sheet engaging edges 145 of the remaining ten outer pleater elements are inclined as above indicated. The angle A indicated in FIG. 21 varies from about 1° in the case of pleater elements 105 to about 5° in the case of the short pleater elements 109.

The effectiveness of the pleater shown in FIGS. 14 to 21 is attributable to the disposition of the sheet engaging edges of the pleater elements relative to each other as can best be seen from a consideration of FIGS. 16 through 19. It will be noted from FIG. 16 which shows the rear or approach end of the pleater, that the locus of the pleater edges is "crowned" due to the fact that the outer pleater elements are generally narrower at the approach end than the inner pleater elements adjacent the central plane of the pleater. This condition exists for both the upper and lower sets of pleater elements. Another important factor which cooperates to give effective pleating can be seen from FIG. 15 from which it is apparent that the central portion of the sheet to be pleated is engaged by the inner pleater elements before the outer pleater elements engage the outer or marginal portions of the sheet.

Figure 17:
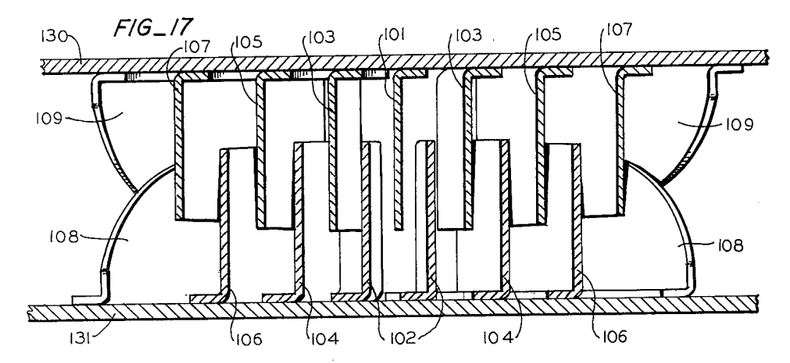
FIG. 17 is a cross section of the pleater taken in a plane indicated by lines 17—17 of FIG. 15.
Figure 18:
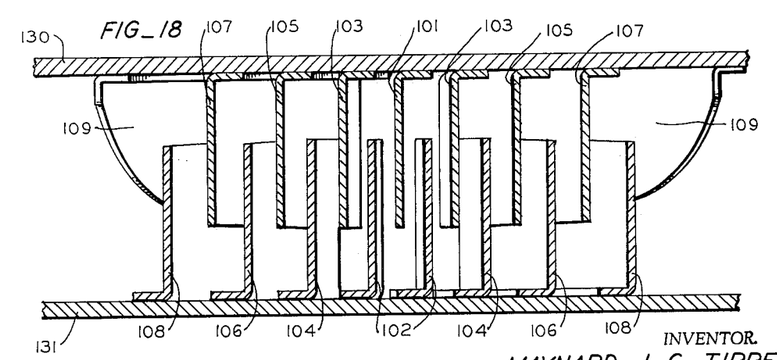
FIG. 18 is a cross section of the pleater taken in a plane indicated by lines 18—18 of FIG. 15.

The crowned effect of the locus of the pleater edges continues from the approach end to the discharge end of the pleater as can be seen from FIGS. 17, 18 which show that the lesser depth of the outer pleater elements continues up to the discharge end of the pleater although to a lesser degree than at the approach or rear end of the pleater.

Figure 19:
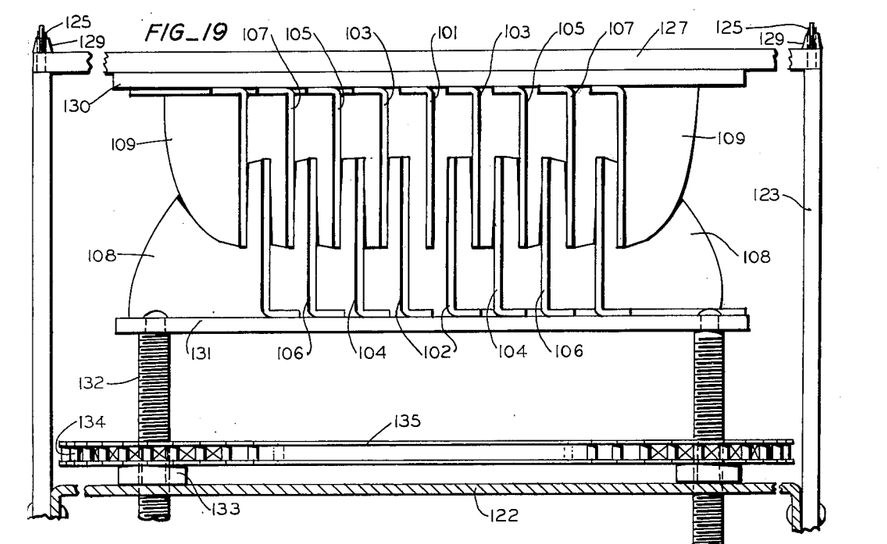
FIG. 19 is an end elevation of the pleater of FIG. 14 taken from the forward or discharge end of the pleater.

It will be seen from FIG. 19 showing the forward or discharge end of the pleater that when the sheet emerges from the pleater all of the pleats are of the same depth just as in the previously described form of pleater shown in FIGS. 2 and 4.

The pleater disclosed in FIGS. 14 through 21 is capable of forming pleats that are relatively deep compared to the pleats formed by the pleater of FIGS. 2 and 4. Furthermore, the second described pleater is adapted to pleat a sheet of greater width than may be pleated by the pleater of FIGS. 2 and 4.

The great effectiveness of the pleater of FIGS. 14 to 21 is attributable in part to the fact that the particular disposition of the pleater elements as disclosed permits a point on the sheet to move transversely inwardly of the pleater relative to the edges of the pleater elements which engage the sheet. It will be recalled that in the pleater of FIGS. 2 and 4 a point on the sheet in engagement with an edge of a pleater element remains in engagement with such edge throughout the entire pleating step. On the other hand, a point on the sheet pleated by the pleater of FIGS. 14 through 21 moves relative to the pleater edges in a transverse direction inwardly toward the central plane of the pleater. Such relative sliding movement in a transverse direction is permitted because of the lesser amount of friction created by the second described pleater due to the particular disposition of the pleater edges as above described. In other words, as the sheet is engaged by the pleater the central pleating elements 101, 102, 103 and 104 begin the formation of the central pleats before the corresponding pleats are commenced by the outer pleater elements. Such formation of the central pleats requires that the material of the pleats moves progressively inwardly as the pleater progressively forms the pleats toward the outer marginal portions of the sheets.

The sliding movement of the film in a transverse direction across the pleating edges produces the desirable condition of keeping the film relatively taut across the interleaving pleater edges as the film emerges from the discharge end. This ensures that all pleats are of uniform size when they emerge from the discharge end of the pleater. Because the film is taut between the pleater edges, this prevents bunching or looseness of the film near the center pleats during prolonged processing of roll stock. In other words, the taper on the pleater blades ensures uniform folds or pleats.

The present invention contemplates the formation of pleated material in a continuous ribbon for whatever purpose it is desired. Such formation being a distinct and separate operation from the tying and cutting operations above described. In other words, although the second described pleater may be employed with the apparatus above described for tying and cutting in the same manner as the pleater of FIGS. 2 and 4, it is nevertheless contemplated that both forms of pleater may be employed for general pleating operations regardless of the subsequent use of the pleated material.

In FIG. 22 a pleated bag 150 is shown tied at one end with a clip 151. It is understood that this type of bag may be formed by the apparatus hereinbefore described. However, the pleats shown formed in bag 150 will be of a lesser number and greater depth when the modified form of pleater is employed and of a greater number and less depth when the pleater of FIGS. 2 and 4 is employed.

The very specific description of the preferred forms of the invention given above is not to be taken as restrictive since it will be apparent to those skilled in the art that various modifications in design may be resorted to without departing from the following claims.

I claim:

1. Bag forming apparatus adapted to form bags from an elongated sheet of flattened tubular material comprising:
   a pleater adapted to receive said sheet therein for movement therethrough in a direction longitudinally of said sheet for forming said sheet in longitudinally extending pleats, a clipper adapted to receive said pleated sheet therein and to apply clips around said sheet in sealing relation therewith to form seals at points spaced apart longitudinally of said sheet, a cutter spaced forwardly of said clipper relative to the direction of travel of said sheet a distance substantially equal to the length of each of said bags, and actuating means associated with said cutter and actuated by said clips for energizing said clipper and for cutting said pleated sheet.

2. Apparatus according to claim 1 wherein said actuating means includes a time delay causing said cutter to be actuated a short interval of time after said clipper is actuated to apply a clip.

3. An apparatus for continuous production of fastened and cut casing lengths from a roll of tubular casing fed therein, comprising:

a flat elongated base, a flat casing pleater bottom mounted at one end of said base is feedable relation to a roll of casing and having a series of upwardly projecting ridges spaced farther apart at its casing feed end and close together at its casing outlet and, a flat casing pleater top hinged at its feed end to the feed end of said pleater bottom in a manner to permit flat casing to be fed between both pleater units near their hinge, and having a series of downwardly projecting ridges in interleaving relation with the ridges in said pleater bottom, and fastenable thereto when closed, a vertical casing fastener mounted on said base in feedable relation to said pleater outlet end and having a throat into which a pleated casing may be fed and a lower crimping die at the bottom of said throat and on which a fastener may be crimped onto a pleated casing discharged from said pleater, and having a vertical wall adjacent and downstream from said die, a spring loaded gate hinged at its bottom in said wall below the level of said die and having a casing feed throat disposed in juxtaposition with said fastener throat, said gate throat terminating somewhat above said die in a manner so as to hold a pleated casing suspended sufficiently above said die to enable a fastener to circumscribe a casing and be crimped on said die without pinching such casing, and designed to open and permit passage therethrough of a crimped fastener as a casing is pulled through its throat, a switch and cutter assembly movably mounted in stream relation on said base, a main switch mounted on said assembly and connected to said fastener and the hereinafter mentioned knife actuating unit and actuated by the hereinafter mentioned thrust plate, a thrust plate mounted on said assembly and having a throat substantially in line with said other throats and designed to permit passage therethrough of pleated casing, but not a crimped fastener thereon, and connected to said switch in a manner such that when a thrust is exerted by pressure thereon of a fastener crimped onto a pleated casing pulled through its throat, said plate will actuate said switch causing fastening of a casing upstream in said fastener and cutting of the end thereof at the thrust plate, and a knife and knife actuating unit mounted downstream adjacent said thrust plate, and connected to said switch in a manner such that when the thrust plate actuates said switch said knife cuts a casing near the downstream side of said throat after the fastener has crimped a fastener.

4. An apparatus according to claim 3 in which a time delay switch is inserted between said main switch and said knife actuating unit and designed to delay the action of said actuating unit until after said fastener has crimped on a fastener on a casing.

5. An apparatus for continuous production of fastened and cut casing lengths from a roll of tubular casing fed therein, comprising:

a flat elongated base, a support mounted at one end of said base for holding a roll of casing, a flat casing pleater bottom mounted on said base in feedable relation to said support, and having a series of upwardly projecting ridges spaced farther apart at its casing feed end and close together at its casing outlet end, a flat casing pleater top hinged at its feed end to the feed end of said pleater bottom in a manner to permit flat casing to be fed between both pleater units near the hinge, and having a series of downwardly projecting ridges in interleaving relation with the ridges in said pleater bottom, and fastenable thereto when closed, a vertical casing fastener mounted on said base in feedable relation to said pleater outlet end and having a throat into which a pleated casing may be fed and a lower crimping die at the bottom of said throat and on which a fastener may be crimped onto a pleated casing discharged from said pleater, and having a vertical wall adjacent and downstream from said die, a spring loaded gate hinged at its bottom in said wall below the level of said die and having a casing feed throat disposed in juxtaposition with said fastener throat, said gate throat terminating somewhat above said die in a manner so as to hold a pleated casing suspended sufficiently above said die to enable a fastener to circumscribe a casing and be crimped on said die without pinching such casing, and designed to open and permit passage therethrough of a crimped fastener as a casing is pulled through its throat, a switch and cutter assembly movably mounted in stream relation on said base, a main switch mounted on said assembly and connected to said fastener and the hereinafter mentioned knife actuating unit and actuated by the hereinafter mentioned thrust plate, a thrust plate mounted on said assembly and having a throat substantially in line with said other throats and designed to permit passage therethrough of pleated casing, but not a crimped fastener thereon, and connected to said switch in a manner such that when a thrust is exerted by pressure thereon of a fastener crimped onto a pleated casing pulled through its throat, said plate will actuate said switch causing fastening of a casing upstream in said fastener and cutting of the end thereof at the thrust plate, and a knife and knife actuating unit mounted downstream adjacent said thrust plate, and connected to said main switch in a manner such that when the thrust plate actuates said switch said knife cuts a casing near the downstream side of said throat after the fastener has crimped a fastener.

6. A method of continuously producing fastened and cut casing lengths from a roll of tubular casing, comprising:

feeding said casing in flat form from said roll through a pleater, whereby said casing is pleated into compact shape, feeding said pleated casing through a vertical fastener, wherein said casing is fastened by a crimped fastener, feeding the fastened casing through the throat of a thrust plate switch and cutter, said throat being narrow enough to permit passage therethrough of said casing, but not said fastener, and pulling said fastener on said casing against said thrust plate whereupon said plate effects the fastened of the casing upstream and effects the cutting of the casing downstream adjacent said throat.

7. Bag forming means adapted to form bags from an elongated sheet of flattened tubular material comprising:
pleating means adapted to receive said sheet therein for movement therethrough in a direction longitudinally of said sheet,
sealing means adapted to seal said pleated sheet at spaced points along the length thereof,
cutting means for cutting said sheet adjacent said points,
power means interconnecting said sealing means and said cutting means for actuation of said cutting means automatically upon actuation of said sealing means.

8. A device according to claim 7 wherein said cutting means is spaced forwardly of said sealing means relative to the direction of movement of said sheet a distance substantially equal to the length of the bag to be formed, and delayed action means is provided for actuating said cutting means a slight interval of time after actuation of said sealing means.

References Cited by the Examiner
UNITED STATES PATENTS

| | | | |
|---|---|---|---|
| 2,320,326 | 5/1943 | Avery | 93—18 |
| 2,589,792 | 3/1952 | Frank et al. | 93—84 X |
| 2,697,970 | 12/1954 | Tipper | 93—84 |
| 2,831,302 | 4/1958 | Jensen et al. | 53—138 |
| 3,138,077 | 6/1964 | Bauder et al. | 93—84 |

FRANK E. BAILEY, *Primary Examiner.*